United States Patent
Wu

(10) Patent No.: US 10,292,078 B1
(45) Date of Patent: May 14, 2019

(54) DEVICE AND METHOD OF HANDLING AN EVOLVED PACKET SYSTEM BEARER CONTEXT

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/181,186

(22) Filed: Nov. 5, 2018

Related U.S. Application Data

(60) Provisional application No. 62/582,962, filed on Nov. 8, 2017.

(51) Int. Cl.
H04W 36/00 (2009.01)
H04W 36/04 (2009.01)

(52) U.S. Cl.
CPC ....... *H04W 36/04* (2013.01); *H04W 36/0022* (2013.01); *H04W 36/0066* (2013.01)

(58) Field of Classification Search
CPC ............. H04W 36/04; H04W 36/0022; H04W 36/0066
USPC ........................................................ 455/436
See application file for complete search history.

(56) References Cited

PUBLICATIONS

Search Report dated Dec. 17, 2018 for EP application No. 18205048. 4, pp. 1-5.
3GPP TS 23.501 V1.4.0 (Sep. 2017), "3rd Generation Partnership Project; Technical Specification Group Services and System Aspects; System Architecture for the 5G System; Stage 2 (Release 15)", XP051359415, pp. 1-151.
3GPP TS 23.502 V1.2.0 (Sep. 2017), "3rd Generation Partnership Project; Technical Specification Group Services and System Aspects; Procedures for the 5G System; Stage 2 (Release 15)", XP051359409, pp. 1-165.
ZTE, "TS 23.501 P-CR to Discussion and proposal on the UE and network behaviour for SR only mode UE.", SA WG2 Meeting #S2-121, S2-173472, May 15-19, 2017, Hangzhou, China, XP051281962, pp. 1-5.

*Primary Examiner* — Amancio Gonzalez
(74) *Attorney, Agent, or Firm* — Winston Hsu

(57) ABSTRACT

A method for handling an EPS bearer context comprises transmitting a first protocol data unit (PDU) Session identity (ID) to a long-term evolution (LTE) network; receiving a first EPS bearer ID identifying a first EPS bearer, from the LTE network; configuring a first data radio bearer (DRB) associated to the first EPS bearer ID, with the LTE network; communicating data via the first DRB with the LTE network; connecting to a new radio (NR) network and disconnecting from the LTE network; keeping the first EPS bearer ID and the first PDU Session ID; configuring a second DRB associated to the first PDU Session ID, with the NR network; connecting to the LTE network and disconnecting from the NR network; keeping the first EPS bearer ID and the first PDU Session ID; and configuring a third DRB associated to the first EPS bearer ID.

9 Claims, 6 Drawing Sheets

DEVICE AND METHOD OF HANDLING AN EVOLVED PACKET SYSTEM BEARER CONTEXT

CROSS REFERENCE TO RELATED APPLICATIONS

This application claims the benefit of U.S. Provisional Application No. 62/582,962 filed on Nov. 8, 2017, which is incorporated herein by reference.

BACKGROUND OF THE INVENTION

1. Field of the Invention

The present invention relates to a device and a method used in a wireless communication system, and more particularly, to a device and a method of handling an evolved packet system (EPS) bearer context in a wireless communication system.

2. Description of the Prior Art

Recently, a fifth generation (5G) system (or called next generation system) has been developed by the 3rd Generation Partnership Project (3GPP). To provide seamless service continuity for a communication device moving between an evolved packet system (EPS) and the 5G system, an inter-system mobility between the two systems is an issue to be solved.

SUMMARY OF THE INVENTION

The present invention therefore provides a communication device for handling an EPS bearer context to solve the abovementioned problem.

A communication device for handling an EPS bearer context comprises at least one storage device for storing instructions and at least one processing circuit coupled to the at least one storage device. The at least one processing circuit is configured to execute the instructions stored in the at least one storage device. The instructions comprise transmitting a first protocol data unit (PDU) Session identity (ID) to a LTE network; receiving a first EPS bearer ID identifying a first EPS bearer, from the LTE network, wherein the first EPS bearer ID is associated with the first PDU Session ID; configuring a first data radio bearer (DRB) associated to the first EPS bearer ID, with the LTE network; communicating data via the first DRB with the LTE network; connecting to a NR network and disconnecting from the LTE network; keeping the first EPS bearer ID and the first PDU Session ID, when connecting to the NR network and disconnecting from the LTE network; configuring a second DRB associated to the first PDU Session ID, with the NR network; connecting to the LTE network and disconnecting from the NR network; keeping the first EPS bearer ID and the first PDU Session ID, when connecting to the LTE network and disconnecting from the NR network; and configuring a third DRB associated to the first EPS bearer ID, when connecting to the LTE network and disconnecting from the NR network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
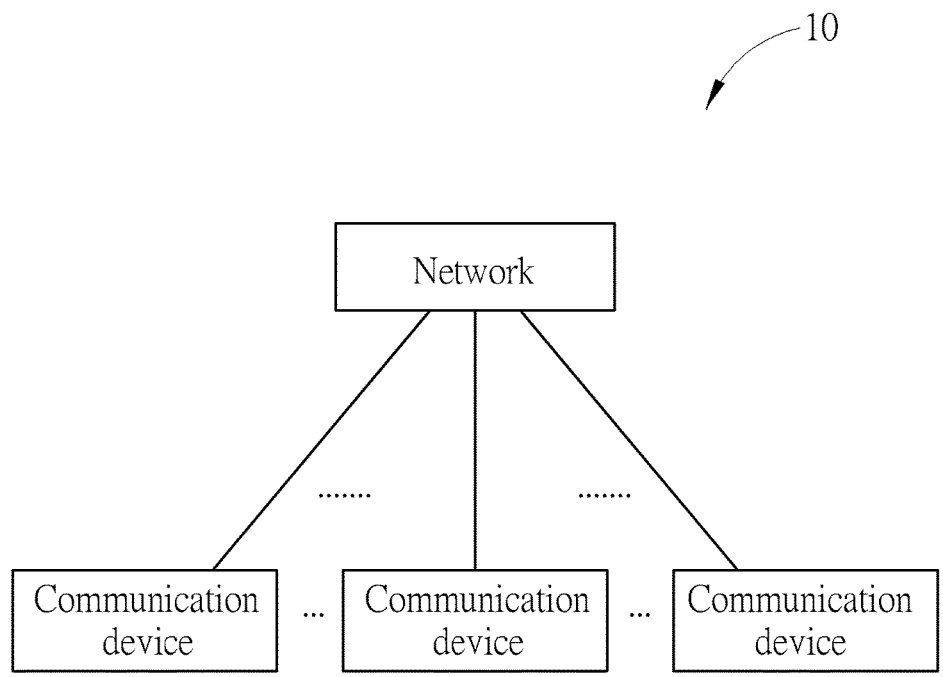
FIG. 1 is a schematic diagram of a wireless communication system according to an example of the present invention.

In FIG. 1, a network and communication devices are simply utilized for illustrating the structure of a wireless communication system 10. Practically, the network includes at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, 100, or 200 us) for communication between the communication devices and the 6G base station (BS).

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
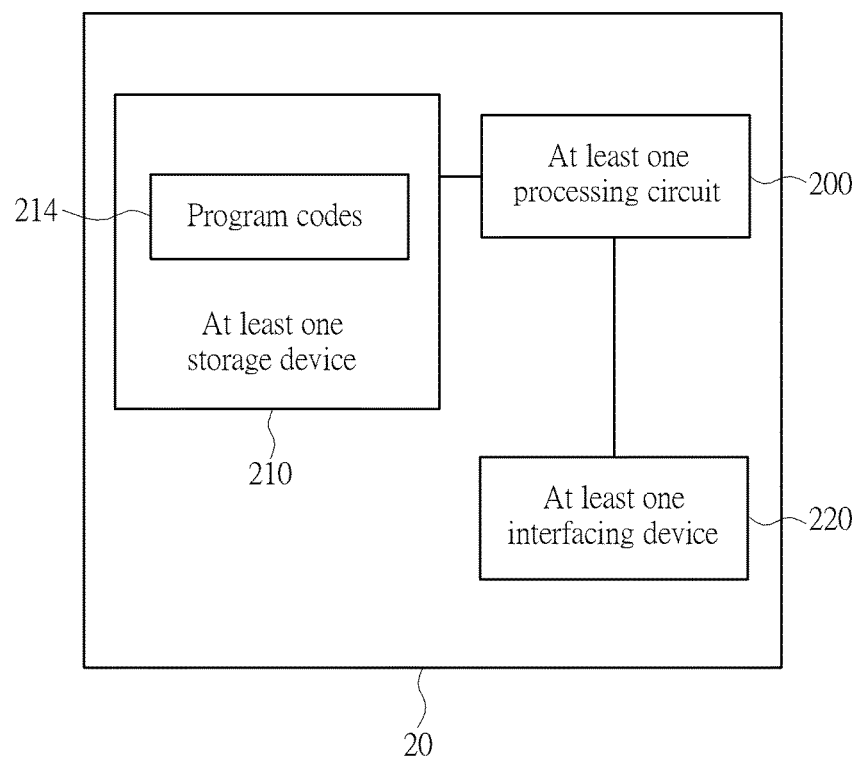
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214 accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

In the following examples, a UE is used for representing a communication device in FIG. 1, to simplify the illustration of the examples.

Figure 3:
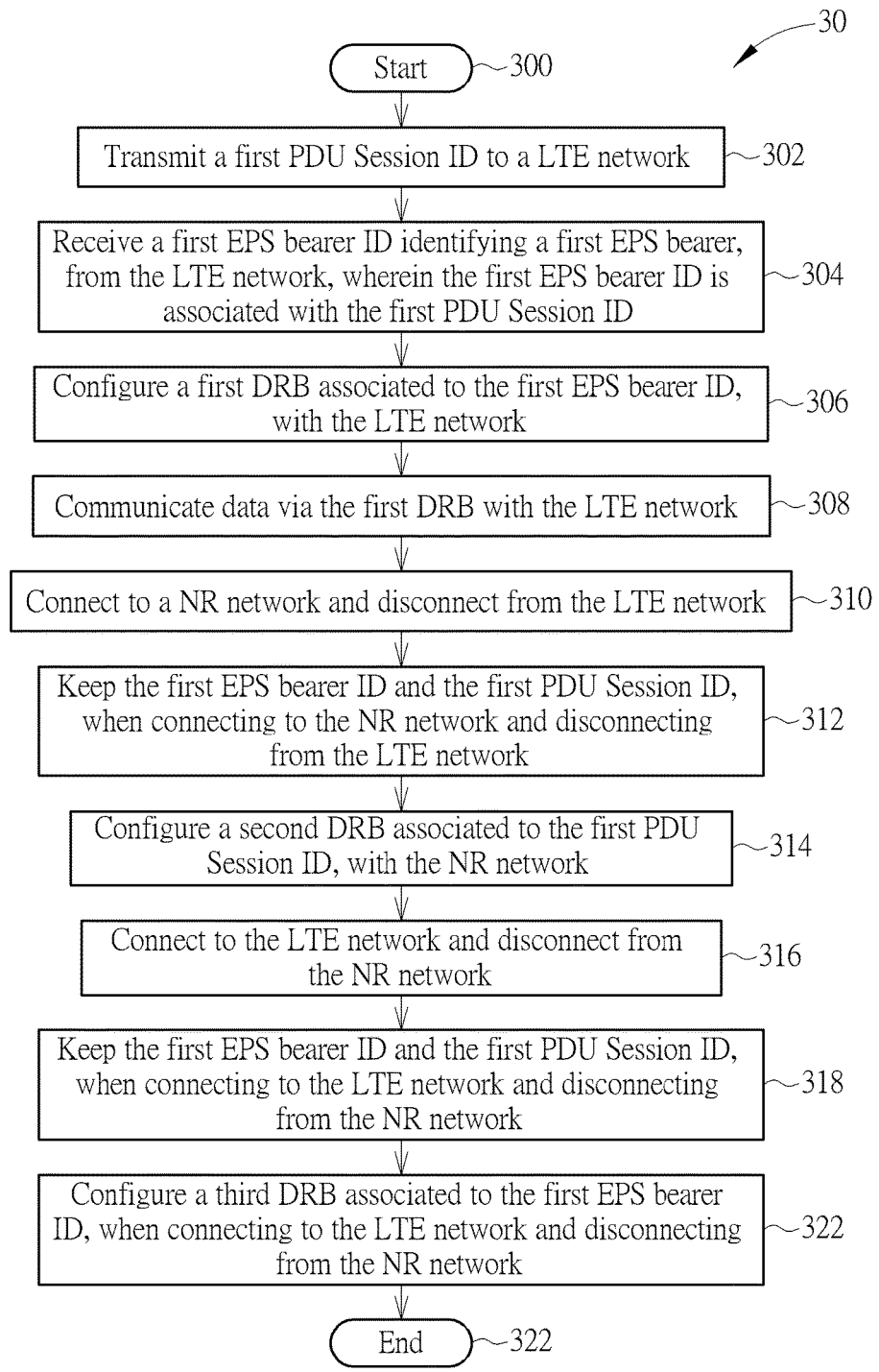
FIG. 3 is a flowchart of a process according to an example of the present invention.

A process 30 in FIG. 3 is utilized in a UE to handle an evolved packet system (EPS) bearer context, and includes the following steps:

Step 300: Start.

Step 302: Transmit a first protocol data unit (PDU) Session identity (ID) to a LTE network.

Step 304: Receive a first EPS bearer ID identifying a first EPS bearer, from the LTE network, wherein the first EPS bearer ID is associated with the first PDU Session ID.

Step 306: Configure a first data radio bearer (DRB) associated to the first EPS bearer ID, with the LTE network.

Step 308: Communicate data via the first DRB with the LTE network.

Step 310: Connect to a NR network and disconnect from the LTE network.

Step 312: Keep the first EPS bearer ID and the first PDU Session ID, when connecting to the NR network and disconnecting from the LTE network.

Step 314: Configure a second DRB associated to the first PDU Session ID, with the NR network.

Step 316: Connect to the LTE network and disconnect from the NR network.

Step 318: Keep the first EPS bearer ID and the first PDU Session ID, when connecting to the LTE network and disconnecting from the NR network.

Step 320: Configure a third DRB associated to the first EPS bearer ID, when connecting to the LTE network and disconnecting from the NR network.

Step 322: End.

According to the process 30, the UE keeps the first EPS bearer ID and the first PDU Session ID, when connecting to the NR network and connecting back to the LTE network. That is, the UE keeps the first EPS bearer ID and the first PDU Session ID when moving back and forth between the LTE network and the NR network. If the UE does not keep the first EPS bearer ID when connecting to the NR network and disconnecting from the LTE network, the UE fails to apply a configuration of the third DRB received from the LTE network since the UE does not recognize the first EPS bearer ID in the configuration of the third DRB. Thus, the UE fails to configure (or establish) the third DRB according to the configuration of the third DRB, and consequently, the UE cannot communicate (e.g., transmit or receive) data with (e.g., to or from) the LTE network.

Realization of the process 30 is not limited to the above description. The following examples may be applied to the process 30.

In one example, the UE receives a first DRB configuration from the LTE network, and configures the first DRB according to the first DRB configuration. In one example, the EPS bearer ID is associated with the PDU Session ID by the UE.

In one example, the UE connects to a first cell of a first BS in the LTE network. The UE communicates (e.g., transmits or receives) data via (e.g., on or over) the first DRB with (e.g., to or from) the first BS. Then, the UE connects to a second cell of a second BS in the NR network and disconnects from the first cell of the first BS in the LTE network in response to (or due to) a handover, a cell selection or reselection or a redirection. In case of the handover, the UE receives a handover command (e.g., a radio resource control (RRC) Connection Reconfiguration or a RRC Reconfiguration) from the first BS. The handover command configures the UE to hand over to the second cell of the second BS and configures the second DRB. The UE connects to the second cell of the second BS and configures the second DRB according to the handover command. The UE transmits a handover complete message (e.g., a RRC Connection Reconfiguration Complete or a RRC Reconfiguration Complete) via the second cell to the second BS, and communicates data via the second DRB with the second BS in the NR network. The UE keeps (or maintains) the first EPS bearer ID and the first PDU Session ID, when connecting to the NR network according to the handover command. In case of the cell selection or reselection, the UE selects the second cell of the NR network to camp from the first cell. In case of the redirection, the UE receives a redirection command from the first BS via the first cell. The redirection command indicates the second cell, a frequency of the NR network or selecting the NR network. The UE enters an idle mode and selects the second cell according to the redirection command. The UE receives a second DRB configuration from the second BS and configures the second DRB according to the second DRB configuration, when connecting to the second BS via the second cell in a connected state from an idle state in the NR network.

In one example, the UE connects back to a third cell of a third BS in the LTE network and disconnects from the second cell of the second BS in the NR network in response to (or due to) a handover, a cell selection or reselection or a redirection. In case of the handover, the UE receives a handover command (e.g., a RRC Connection Reconfiguration or a RRC Reconfiguration) from the second cell. The handover command configures the UE to hand over to the third cell and configures the third DRB. The UE connects to the third BS via the third cell and configures the third DRB according to the handover command. The UE communicates data via the third DRB with the third BS. The UE keeps (or maintains) the first EPS bearer ID and the first PDU Session ID, when connecting to the LTE network according to the handover command. In case of the cell selection or reselection, the UE selects the third cell to camp from the second cell. In case of the redirection, the UE receives a redirection command from the second BS via the second cell. The redirection command indicates the third cell of the LTE network, a frequency of the LTE network or selecting the LTE network. The UE enters an idle mode and connects to the third cell according to the redirection command. The UE receives a third DRB configuration from the third BS and configures the third DRB according to the third DRB configuration, when connecting to the third BS via the third cell in a connected state from an idle state in the NR network. The first BS and the third BS are the same BS or different BSs. The first cell and the third cell are the same cell or different cells.

In one example, the UE considers that the first PDU Session ID and the first EPS bearer ID are valid, when keeping the first EPS bearer ID and the first PDU Session ID. The UE uses the kept first PDU Session ID to communicate with the NR network, and uses the kept first EPS bearer ID to communicate with the LTE network.

In one example, since the UE keeps the first PDU Session ID, the UE considers that a DRB configuration including the first PDU Session ID and configuring a DRB associated to the first PDU Session ID are valid, when the UE receives the DRB configuration (e.g., in a RRC Reconfiguration message) from the NR network directly or via the LTE network. In one example, the DRB configuration indicates that the DRB is a default DRB. For example, the DRB configuration includes a field or an information element (IE) indicating that the DRB is a default DRB.

In one example, since the UE keeps the first EPS bearer ID, the UE considers that a DRB configuration including the EPS bearer ID and configuring a DRB associated to the EPS bearer ID is valid, when the UE receives the DRB configuration (e.g., in a RRC Connection Reconfiguration message) from the LTE network directly or via the NR network.

In one example, since the UE keeps the first PDU Session ID, the UE transmits a first non-access stratum (NAS) message including the first PDU Session ID to the NR network, when or after the UE connects to the NR network and disconnects from the LTE network. For example, the first NAS message is a Mobility Management (MM) message (e.g., a Registration Request, a Registration Complete or a Service Request) or a Session Management (SM) message (e.g., a PDU Session Release Request or a PDU Session Modification Request).

In one example, since the UE keeps the first PDU Session ID, the UE receives a second NAS message including the first PDU Session ID from the NR network, when or after the UE connects to the NR network and disconnects from the LTE network. For example, the second NAS message is a MM message (e.g., a Registration Accept, a Service Accept or a UE Configuration Update Command) or a SM message (e.g., a PDU Session Release Accept or a PDU Session Modification Accept). The second NAS message includes or does not include the first EPS bearer identity.

In one example, since the UE keeps the first EPS bearer identity, the UE transmits a third NAS message including the first EPS bearer ID to the LTE network, when or after the UE connects to the LTE network and disconnects from the NR network. For example, the third NAS message is a MM message (e.g., a Tracking Area Update Request or a Tracking Area Update Complete) or a SM message (e.g., a packet data network (PDN) Disconnect Request, a Bearer Resource Allocation Request, a Bearer Resource Modification Request, an Activate Dedicated EPS Bearer Context Accept, an Activate Dedicated EPS Bearer Context Reject, a Modify EPS Bearer Context Accept, a Modify EPS Bearer Context Reject or a Deactivate EPS Bearer Context Accept).

In one example, since the UE keeps the first EPS bearer ID, the UE receives a fourth NAS message including the first EPS bearer identity from the LTE network, when or after the UE connects to the LTE network and disconnects from the NR network. For example, the fourth NAS message is a MM message (e.g., a Tracking Area Update Accept) or a SM message (e.g., a Deactivate EPS Bearer Context Request, a PDN Disconnect Reject, an Activate Dedicated EPS Bearer Context Request, a Modify EPS Bearer Context Request, a Bearer Resource Allocation Reject or a Bearer Resource Modification Reject). The fourth NAS message includes or does not include the first PDU Session ID.

In one example, the UE transmits the first PDU Session ID in a SM message (e.g., a PDN Connectivity Request message) to the LTE network. The UE receives the first EPS identity in a SM message (e.g., an Activate Default EPS Bearer Context Request) from the LTE network.

In one example, if the second NAS message is the Registration Accept message which does not include the first PDU Session ID, the UE releases the first PDU Session ID and the first EPS bearer ID. If the second NAS message is the Registration Accept message which does not include the first PDU Session ID, the UE determines that an EPS bearer context which is established and associated to the EPS bearer ID by the LTE network has been released by the NR network. If the second NAS message is the Registration Accept message which does not include the first PDU Session ID, the UE determines that a PDU Session associated to the PDU Session ID is released or is not established or does not exist in the NR network. That is, the NR network does not reestablish the PDU Session associated to the EPS bearer context for the UE.

Figure 4:
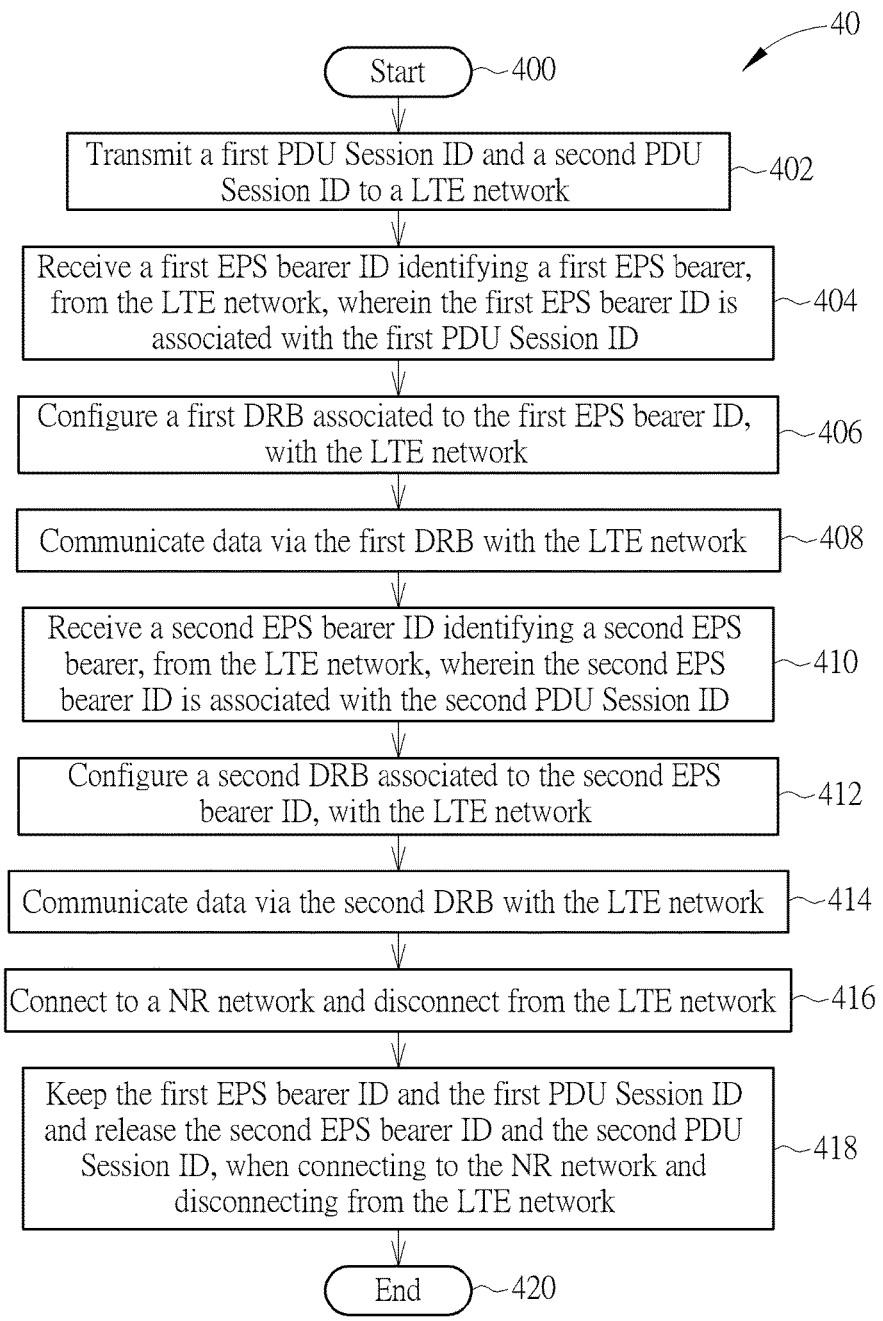
FIG. 4 is a flowchart of a process according to an example of the present invention.

A process 40 in FIG. 4 is utilized in a UE to handle an EPS bearer context, and includes the following steps:

Step 400: Start.
Step 402: Transmit a first PDU Session ID and a second PDU Session ID to a LTE network.
Step 404: Receive a first EPS bearer ID identifying a first EPS bearer, from the LTE network, wherein the first EPS bearer ID is associated with the first PDU Session ID.
Step 406: Configure a first DRB associated to the first EPS bearer ID, with the LTE network.
Step 408: Communicate data via the first DRB with the LTE network.
Step 410: Receive a second EPS bearer ID identifying a second EPS bearer, from the LTE network, wherein the second EPS bearer ID is associated with the second PDU Session ID.
Step 412: Configure a second DRB associated to the second EPS bearer ID, with the LTE network.
Step 414: Communicate data via the second DRB with the LTE network.
Step 416: Connect to a NR network and disconnect from the LTE network.
Step 418: Keep the first EPS bearer ID and the first PDU Session ID and release the second EPS bearer ID and the second PDU Session ID, when connecting to the NR network and disconnecting from the LTE network.
Step 420: End.

As described above, the UE connects to the NR network and disconnects from the LTE network in response to (or due to) the cell selection or the cell reselection, the handover or the redirection. In one example, the UE keeps the first EPS bearer ID and the first PDU Session ID and releases the second EPS bearer ID and the second PDU Session ID according to the handover command. The handover command configures a third DRB associated to the first PDU Session ID but does not configure a DRB associated to the second PDU Session ID. For example, the handover command includes a second DRB configuration configuring the third DRB and includes the first PDU Session ID, but does not include a DRB configuration configuring a DRB and does not include the second PDU Session ID.

In one example, the UE keeps the first EPS bearer ID and the first PDU Session ID and releases the second EPS bearer ID and the second PDU Session ID according to a NAS message received from the NR network (e.g., the second NAS message described above). For example, the NAS message is the Registration Accept, and includes the first PDU Session ID but does not include the second PDU Session ID.

In one example, the UE transmits the first PDU Session ID and the second PDU Session ID in different SM messages (e.g., PDN Connectivity Request messages) to the LTE network. The UE receives the first EPS bearer ID and second EPS bearer ID in different SM messages (e.g., Activate Default EPS Bearer Context Request messages).

Examples described for the process 30 can be applied to the process 40, and are not narrated herein.

Figure 5:
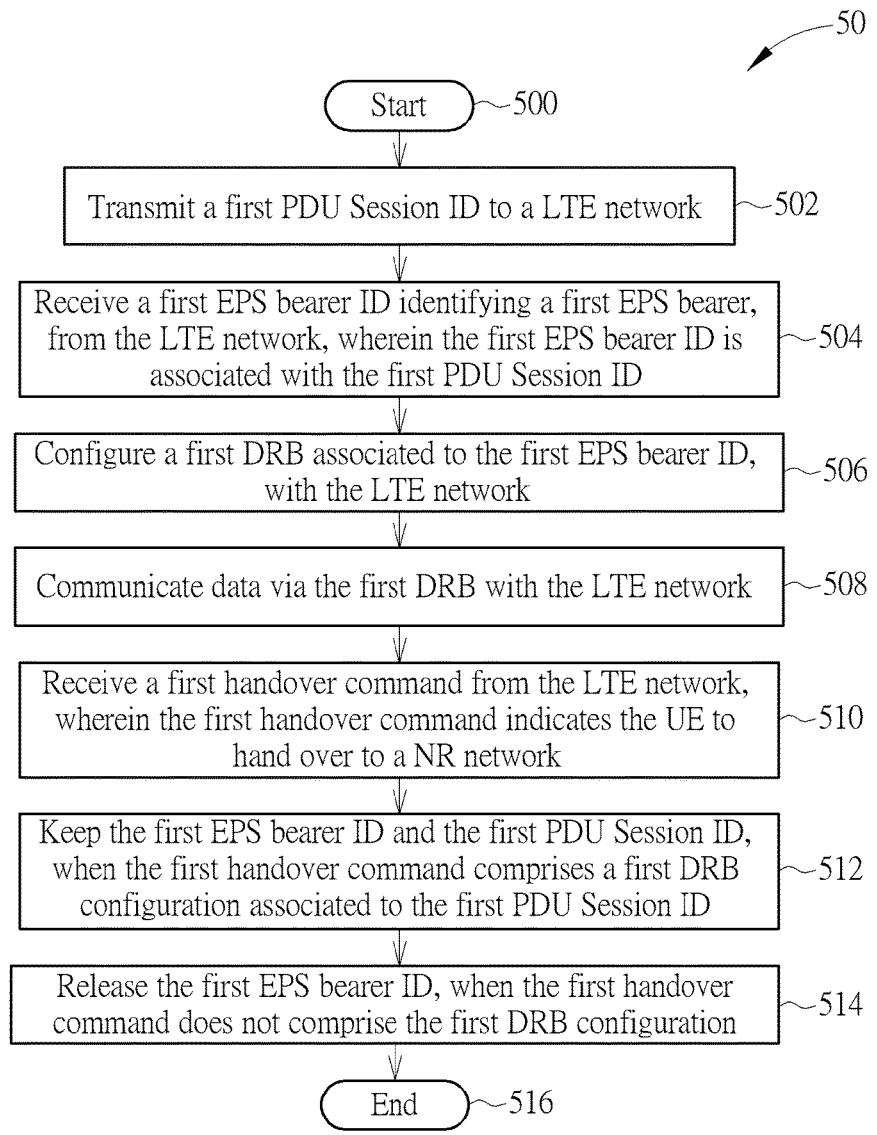
FIG. 5 is a flowchart of a process according to an example of the present invention.

A process 50 in FIG. 5 is utilized in a UE to handle an EPS bearer context, and includes the following steps:

Step 500: Start.
Step 502: Transmit a first PDU Session ID to a LTE network.
Step 504: Receive a first EPS bearer ID identifying a first EPS bearer, from the LTE network, wherein the first EPS bearer ID is associated with the first PDU Session ID.
Step 506: Configure a first DRB associated to the first EPS bearer ID, with the LTE network.
Step 508: Communicate data via the first DRB with the LTE network.

Step 510: Receive a first handover command from the LTE network, wherein the first handover command indicates the UE to hand over to a NR network.

Step 512: Keep the first EPS bearer ID and the first PDU Session ID, when the first handover command comprises a first DRB configuration associated to the first PDU Session ID.

Step 514: Release the first EPS bearer ID, when the first handover command does not comprise the first DRB configuration.

Step 516: End.

According to the process 50, the UE keeps an EPS bearer ID associated to a PDU Session ID if a received handover command includes a DRB configuration associated to the PDU Session ID, and the UE releases the EPS bearer ID if the received handover command does not include a DRB configuration associated to the PDU Session ID. That is, the UE determines that an EPS bearer context identified by the first EPS bearer ID is kept, when handing over to the NR network from the LTE network. The UE determines that the EPS bearer context is released when handing over to the NR network from the LTE network.

Realization of the process 50 is not limited to the above description. The following examples may be applied to the process 50.

In one example, the UE releases the first PDU Session ID, when the first handover command does not include the first DRB configuration. That is, the UE determines that no PDU Session identified by the first PDU Session ID has been established between the UE and the NR network.

In one example, the UE transmits a second PDU Session ID to the LTE network. The UE receives a second EPS bearer ID identifying a second EPS bearer, from the LTE network, wherein the second EPS bearer ID is associated with the second PDU Session ID. The UE configures a second DRB associated to the second EPS bearer ID, with the LTE network. The UE communicates data via the second DRB with the LTE network. The UE receives a second handover command from the LTE network, wherein the second handover command indicates the UE to hand over to the NR network, and includes a second DRB configuration configuring a second DRB associated to the first PDU Session ID but does not include a third DRB configuration associated to the second PDU Session ID. The UE keeps the first EPS bearer ID and the first PDU Session ID and releases the second EPS bearer ID and the second PDU Session ID, according to the second handover command. The first handover command and the second handover command are the same handover command or different handover commands.

Examples described for the processes 30-40 can be applied to the process 50, and are not narrated herein.

Figure 6:
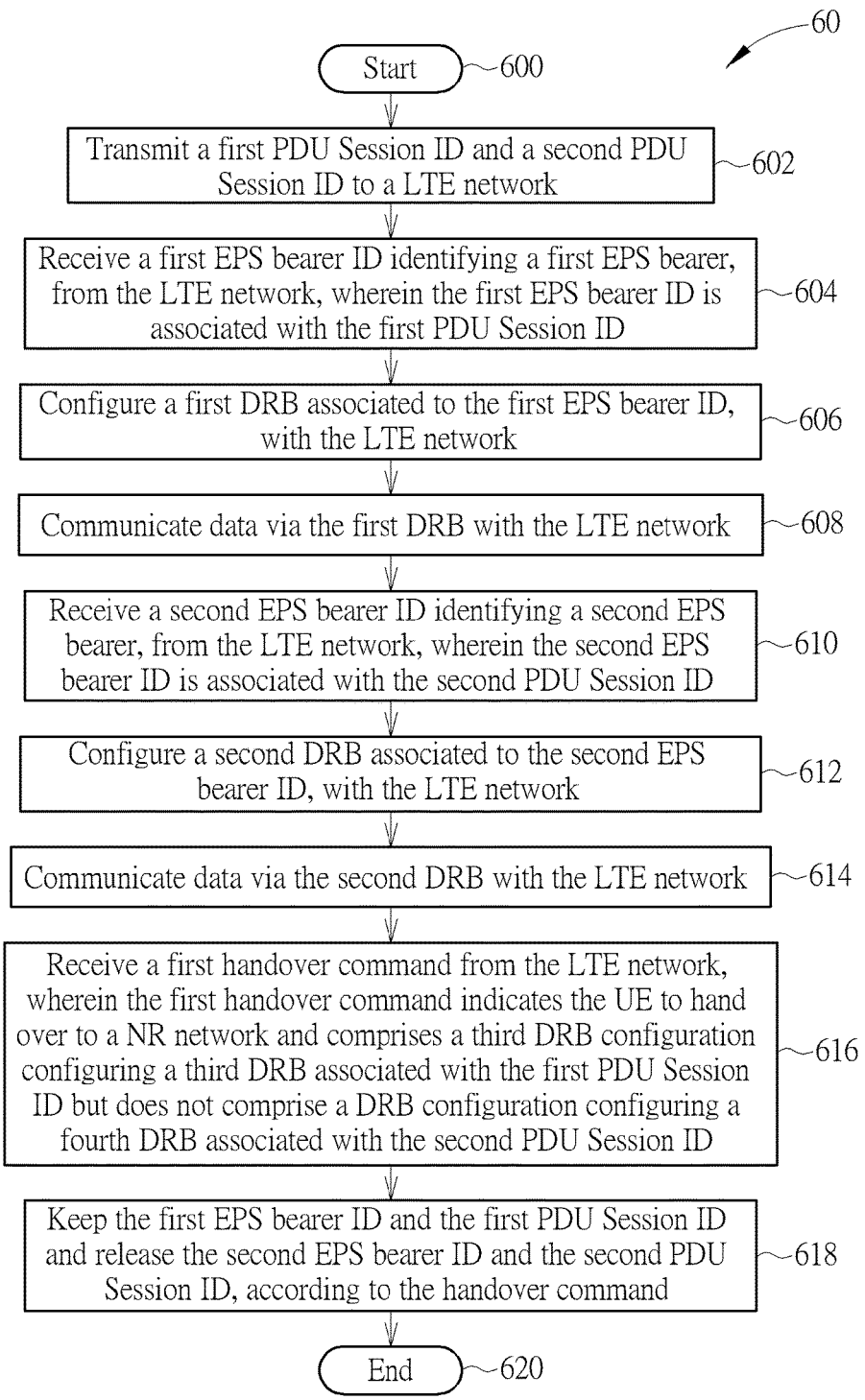
FIG. 6 is a flowchart of a process according to an example of the present invention.

A process 60 in FIG. 6 is utilized in a UE to handle an EPS bearer context, and includes the following steps:

Step 600: Start.

Step 602: Transmit a first PDU Session ID and a second PDU Session ID to a LTE network.

Step 604: Receive a first EPS bearer ID identifying a first EPS bearer, from the LTE network, wherein the first EPS bearer ID is associated with the first PDU Session ID.

Step 606: Configure a first DRB associated to the first EPS bearer ID, with the LTE network.

Step 608: Communicate data via the first DRB with the LTE network.

Step 610: Receive a second EPS bearer ID identifying a second EPS bearer, from the LTE network, wherein the second EPS bearer ID is associated with the second PDU Session ID.

Step 612: Configure a second DRB associated to the second EPS bearer ID, with the LTE network.

Step 614: Communicate data via the second DRB with the LTE network.

Step 616: Receive a handover command from the LTE network, wherein the handover command indicates the UE to hand over to a NR network and comprises a third DRB configuration configuring a third DRB associated with the first PDU Session ID but does not comprise a DRB configuration configuring a fourth DRB associated with the second PDU Session ID.

Step 618: Keep the first EPS bearer ID and the first PDU Session ID and release the second EPS bearer ID and the second PDU Session ID, according to the handover command.

Step 620: End.

Examples described for the processes 30-50 can be applied to the process 60, and are not narrated herein.

The following examples can be applied to any of the processes 30-60.

In one example, the UE configures a first signaling radio bearer (SRB) with the LTE network. The UE receives a handover command via the first SRB. That is, the UE has the first SRB configured to communicate with (e.g., transmit to or receive from) a BS of the LTE network. The UE configures a second SRB with the NR network, when connecting to the NR network and disconnecting from the LTE network. The UE transmits a handover complete message (e.g., a RRC Reconfiguration Complete) on the second SRB to the NR network in response to the handover command.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling an EPS bearer context. The UE keeps the EPS bearer ID when changing a camped network so that the UE can apply a configuration received from the original network. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling an evolved packet system (EPS) bearer context, comprising:
   at least one storage device; and
   at least one processing circuit, coupled to the at least one storage device, wherein the at least one storage device stores, and the at least one processing circuit is configured to execute instructions of:
   transmitting a first protocol data unit (PDU) Session identity (ID) to a long-term evolution (LTE) network;

receiving a first EPS bearer ID identifying a first EPS bearer, from the LTE network, wherein the first EPS bearer ID is associated with the first PDU Session ID;

configuring a first data radio bearer (DRB) associated to the first EPS bearer ID, with the LTE network;

communicating data via the first DRB with the LTE network;

connecting to a new radio (NR) network and disconnecting from the LTE network;

keeping the first EPS bearer ID and the first PDU Session ID, when connecting to the NR network and disconnecting from the LTE network;

configuring a second DRB associated to the first PDU Session ID, with the NR network;

connecting to the LTE network and disconnecting from the NR network;

keeping the first EPS bearer ID and the first PDU Session ID, when connecting to the LTE network and disconnecting from the NR network; and configuring a third DRB associated to the first EPS bearer ID, when connecting to the LTE network and disconnecting from the NR network.

2. The communication device of claim 1, wherein the instructions further comprise:

connecting to the NR network and disconnecting from the LTE network in response to a handover, a cell selection or reselection, or a redirection; and connecting to the LTE network and disconnecting from the NR network in response to the handover, the cell selection or reselection, or the redirection.

3. The communication device of claim 2, wherein the instructions further comprise:

receiving a handover command from a first BS for the handover, wherein the handover command configures the communication device to hand over to a first cell of a second BS and configures the second DRB;

connecting to the first cell of the second BS and configuring the second DRB according to the handover command;

transmitting a handover complete message via the first cell to the second BS;

communicating data via the second DRB with the second BS in the NR network; and keeping the first EPS bearer ID and the first PDU Session ID, when connecting to the NR network according to the handover command.

4. The communication device of claim 2, wherein the instructions further comprise:

receiving a redirection command from a first BS for the redirection, wherein the redirection command indicates a cell of the NR network, a frequency of the NR network or selecting the NR network;

entering an idle mode and connecting to the cell of the NR network according to the redirection command;

receiving a DRB configuration from a second BS in the NR network; and configuring the second DRB according to the DRB configuration.

5. The communication device of claim 1, wherein the instructions further comprise:

transmitting a second PDU Session ID to the LTE network;

receiving a second EPS bearer ID identifying a second EPS bearer, from the LTE network, wherein the second EPS bearer ID is associated with the second PDU Session ID;

configuring a fourth DRB associated to the second EPS bearer ID, with the LTE network;

communicating data via the fourth DRB with the LTE network;

connecting to the NR network and disconnecting from the LTE network; and keeping the first EPS bearer ID and the first PDU Session ID and releasing the second EPS bearer ID and the second PDU Session ID, when connecting to the NR network and disconnecting from the LTE network.

6. A communication device for handling an evolved packet system (EPS) bearer context, comprising:

at least one storage device; and at least one processing circuit, coupled to the at least one storage device, wherein the at least one storage device stores, and the at least one processing circuit is configured to execute instructions of:

transmitting a first protocol data unit (PDU) Session identity (ID) to a long-term evolution (LTE) network;

receiving a first EPS bearer ID identifying a first EPS bearer, from the LTE network, wherein the first EPS bearer ID is associated with the first PDU Session ID;

configuring a first data radio bearer (DRB) associated to the first EPS bearer ID, with the LTE network;

communicating data via the first DRB with the LTE network;

receiving a handover command from the LTE network, wherein the handover command indicates the communication device to hand over to a new radio (NR) network;

keeping the first EPS bearer ID and the first PDU Session ID, when the handover command comprises a DRB configuration associated to the first PDU Session ID; and releasing the first EPS bearer ID, when the handover command does not comprise the DRB configuration.

7. The communication device of claim 6, wherein the instructions further comprise:

transmitting a handover complete message via a cell to a base station (BS).

8. The communication device of claim 6, wherein the instructions further comprise:

configuring a first signaling radio bearer (SRB) with the LTE network; and receiving the handover command via the first SRB from the LTE network.

9. The communication device of claim 8, wherein the instructions further comprise:

configuring a second SRB with the NR network, when connecting to the NR network and disconnecting from the LTE network; and transmitting a handover complete message via the second SRB to the NR network, in response to the handover command.

* * * * *